United States Patent
Bilz et al.

(10) Patent No.: US 6,480,806 B1
(45) Date of Patent: Nov. 12, 2002

(54) AUTOMATIC HEADLIGHT LEVELING SYSTEM FOR MOTOR VEHICLES

(75) Inventors: Frank Bilz, Munich (DE); Peter Lehnert, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 69 days.

(21) Appl. No.: 09/676,214

(22) Filed: Sep. 29, 2000

(30) Foreign Application Priority Data

Oct. 1, 1999 (DE) .......................................... 199 47 408

(51) Int. Cl.[7] .............................................. G06F 15/00
(52) U.S. Cl. ........................ 702/154; 362/460; 362/464; 362/465
(58) Field of Search ................................ 362/460, 464, 362/465; 702/154

(56) References Cited

U.S. PATENT DOCUMENTS 6,183,118 B1 * 2/2001 Toda et al. ................. 315/360

FOREIGN PATENT DOCUMENTS

| EP | 0899156 | 3/1999 |
| FR | 2738193 | 3/1997 |
| JP | 10181426 | 7/1998 |

OTHER PUBLICATIONS

Toop, "Dynamische Leuchtweiteregulung" (Dynamic Headlamp Levelling Control), ATZ Automobiletechnische Zeitschrift 95 (1993) pp. 466–469.

Tietze et al., "Halbleiter–Schaltungstechnik" (Semiconductor Circuitry) (Chapter title: Low Pass as Mean Value Generator), 1986.

* cited by examiner

Primary Examiner—John S. Hilten
Assistant Examiner—Stephen J. Cherry
(74) Attorney, Agent, or Firm—Crowell & Moring LLP

(57) ABSTRACT

A system for automatic headlight leveling control in a motor vehicle has two level sensors which are offset in the longitudinal direction for measuring the vehicle body pitch angle in the form of a level difference. An electronic control unit determines a desired value for the headlight adjustment as a function of the first derivative of the directly measured or further processed level difference. In one embodiment of the invention, electronic control unit determines a static level difference and a dynamic level difference, and the desired value is determined as a function of the first derivative or the second derivative of the dynamic level difference.

9 Claims, 1 Drawing Sheet

AUTOMATIC HEADLIGHT LEVELING SYSTEM FOR MOTOR VEHICLES

BACKGROUND AND SUMMARY OF THE INVENTION

This application claims the priority German patent document 199 47 408.7, filed Oct. 1, 1999, the disclosure of which is expressly incorporated by reference herein.

The invention relates to an automatic headlight leveling system for a motor vehicle.

Dynamic headlight leveling helps to improve traffic safety, since it eliminates the need for the driver to carry out a manual operation, which would have to take place as a function of the vehicle load. When headlights with an improved luminous power are used, for example, by means of electric discharge lamps, the dynamic headlight leveling additionally prevents the projection of glare onto oncoming traffic. This applies also to dynamic operations, as, for example, considerable acceleration.

An automatic headlight leveling system of this type is described, for example, in the ATZ article "Dynamic Automatic Headlight Leveling", 9/1992, Page 466, and on, in which compression of the vehicle springs (which has the effect of a longitudinal inclination or pitch of the vehicle body), is detected by two ultrasonic level sensors which are offset in the longitudinal direction. After measurement, the pitch angle of the vehicle body will be manifested in the form of a level difference. (In this case, the level sensors measure the levels or distances between the vehicle body and the road in the front and in the rear on the vehicle body floor. Level sensors are also used in the form of axle sensors which each measure the level or the distance between the vehicle body and the front and rear vehicle axles). In an electronic control unit having a microcomputer, the desired value for the headlight adjustment, such as the position of a stepping motor to be adjusted, is computed as a function of the measured level difference. The level difference is averaged over a time period which is a function of the vehicle speed.

The known dynamic automatic leveling system differentiates between a slow (static) and a fast (dynamic) control mode. In the slow automatic control mode, the comparatively long-lasting or static pitch angles (longitudinal inclinations) which are generated particularly by the loading of the vehicle, the emptying of the tank and/or the change of the aerodynamic drag are taken into account. In the fast automatic control mode, the changes of the pitch angle as a result of driving-dynamics-related influences (particularly, acceleration or deceleration operations) are taken into account.

In order to avoid stressing the stepping motor in the headlights too long, rapid automatic control mode will be switched on only when a considerable pitch angle change due to driving-dynamics-related influences is to be expected. For this purpose, the first derivative of the vehicle speed signal and/or the brake light signal are analyzed. In view of the actual pitch angle changes, these signals supply only limited information. Furthermore, a control as a function of these signals takes place only in a delayed manner.

One object of the invention is to provide an improved system for an automatic leveling control of the type described above, which avoids the disadvantages of the prior art, under dynamic driving conditions, and at the same time achieves an optimal illumination of the road.

Another object of the invention is to provide a headlight control system that minimizes glare that is directed at the oncoming traffic.

These and other objects and advantages are achieved by automatic headlight leveling system according to the invention, which has two level sensors that are offset in the longitudinal direction for measuring the vehicle body pitch angle in the form of a level difference, and an electronic control unit for determining the desired value for the headlight adjustment as a function of the measured level difference. The control unit determines the desired value as a function of the first derivative of either the directly measured level difference or a further processed level difference. The term "directly measured level difference" indicates particularly the difference of the level values measured by the level sensors and supplied in the form of measuring signals to the control unit. The term "further processed level difference" indicates particularly the difference of the measured level values and/or the level values further processed in the control unit and/or the further processed difference of the measured or further processed level values. Further processing may be, for example, an averaging or another filtering, and may also be another elimination of interfering influences.

By analysis of the first derivative of the level difference, it is determined whether and to what extent a change of the pitch angle actually exists. This permits a more direct automatic pitch angle control. Based on the magnitude of the first derivative, it can, for example, be decided whether a slow or fast automatic control mode is to be selected.

In an advantageous embodiment of the invention, the time period for averaging of the measured level difference is defined as a function of the first derivative of the measured level difference.

In another embodiment of the invention, a static level difference value is determined at least by averaging the directly measured level difference for a first time period; and a dynamic level difference value is determined at least by averaging the directly measured level difference for a second time period. The first time period is defined to be significantly longer than the second time period. The desired value is defined as a function of the first derivative of the dynamic level difference value as the further processed level difference. As a result, the pitch angle deviation due to both static and dynamic influences can be carried out simultaneously. The pitch angle changes due to static and dynamic influences are considered separately, and their mutual interaction can also be taken into account.

The desired value is preferably determined also a function of the second derivative of the dynamic level difference value. By adding vehicle-relevant quantities (such as the position of the center of gravity, moments of inertia, spring rates, etc.), automatic control can be carried out as a function of a predictable pitching movement. This permits a further acceleration and improvement of the control.

In another advantageous embodiment of the invention, the desired value is determined also as a function of additional information transmitted to the control unit (which information is preferably already available from other systems in the vehicle). Such information may, for example, be road information from a navigation system, distance from a preceding vehicle from a ranging system, accelerator pedal position, brake pressure, vehicle speed and/or the visual range of a fog sensor. As a result, a very good situation-adapted intelligent control of the headlight inclination can be carried out.

GPS data, for example, can be used in conjunction with a navigation system in the motor vehicle concerning the type of road (for example, turnpike or city street). The control unit can thereby always implement a comparatively more raised headlight adjustment for turnpikes than for city streets. By means of the level course information of the GPS data and of the navigation system, humps and troughs can be better illuminated.

Furthermore, the current distance from a preceding or an oncoming vehicle can be transmitted, for example, by an ACC system (adaptive cruise control) in the motor vehicle to the control unit. In this case, a lowering of the headlights can always take place for limiting glare.

The position of accelerator pedal or of the throttle valve can be taken into account in order for example, to carry out a preventive lowering of the headlights in the event of an expected elevation of the front wheels as a result of an acceleration operation.

Likewise, the brake pressure or the speed of the change from the accelerator pedal to the brake pedal can be analyzed in order to preventively raise the headlights, for example, in the event of an emergency braking, for improving the visibility.

Finally, the signal of a range-of-vision sensor or fog sensor can also be analyzed in order to preventively lower the headlights in dense fog for minimizing the scattered-light density.

The invention permits more direct, more precise and faster control of the headlight inclination than the prior art.

Other objects, advantages and novel features of the present invention will become apparent from the following detailed description of the invention when considered in conjunction with the accompanying drawings.

DETAILED DESCRIPTION OF THE DRAWINGS

Figure 1:
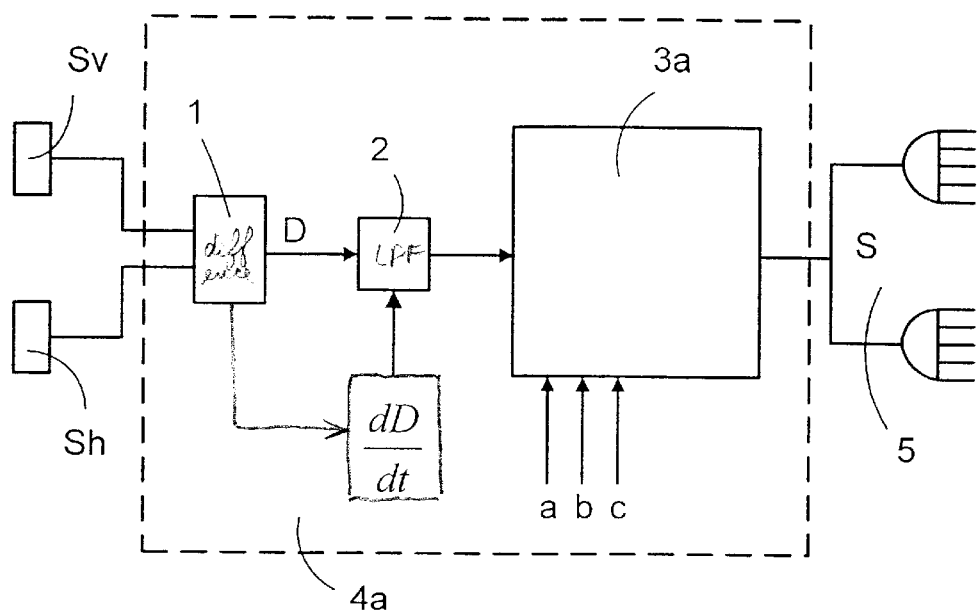
FIG. 1 is a schematic view of a first automatic headlight leveling system according to the invention.

FIG. 1 illustrates two level sensors offset in the longitudinal direction on a vehicle (not shown); specifically a forward sensor Sv and a rearward sensor Sh. As known from the prior art, the sensors Sv and Sh are, for example, ultrasonic sensors in the front and rear on the vehicle body floor or axle sensors at the front and at the rear axle. To measure the vehicle body pitch angle in the form of a level difference D, the output signals of the sensors Sv and Sh are connected with a level difference detector 1 of an electronic control unit 4a, which in turn is connected with a filter 2. In the control unit 4a, the first time derivative dD/dt of the directly measured level difference D is calculated. The filter 2, which averages the level difference, may be for example, a low-pass filter whose time constant can be adjusted as a function of dD/dt. The averaged value of the level difference is transmitted from the filter to a desired-value detector 3a of the control unit 4a.

The desired value S for the adjustment of the headlight arrangement 5, which is shown here only schematically, is computed in the desired-value detector 3a as a function of the averaged value of the level difference and optionally of other signals a, b and c. The signals a, b and c are, for example, the vehicle speed signal, the brake light signal and the accelerator pedal position signal.

It is always checked in the control unit 4a whether the first derivative dD/dt of the level difference exceeds a defined threshold. If so, the pitch angle has changed such that a follow-up of the headlights may be necessary. By determining the time constant of the filter 2, as a function of the value of the first derivative or of the frequency of the change of the value of the first derivative dD/dt, a slow or fast automatic control can be initiated. In the simple control unit 4a illustrated in FIG. 1, the switch-over function of the speed signal known from the prior art based on the value of the first derivative dD/dt of the level difference can therefore be taken over. In this manner, a control is achieved which is more responsive to the actual vehicle pitch angle change than in the prior art.

By taking into account the additional signals, the control can be better adapted to the respective situation. For example, the lowering of the headlights in response to vehicle body pitch (amount of the desired value S) can always be reduced at a high speed because here no high forces which deflect the vehicle can act upon the chassis. The brake light signal and the accelerator pedal signal indicate an imminent deceleration or acceleration operation.

Figure 2:
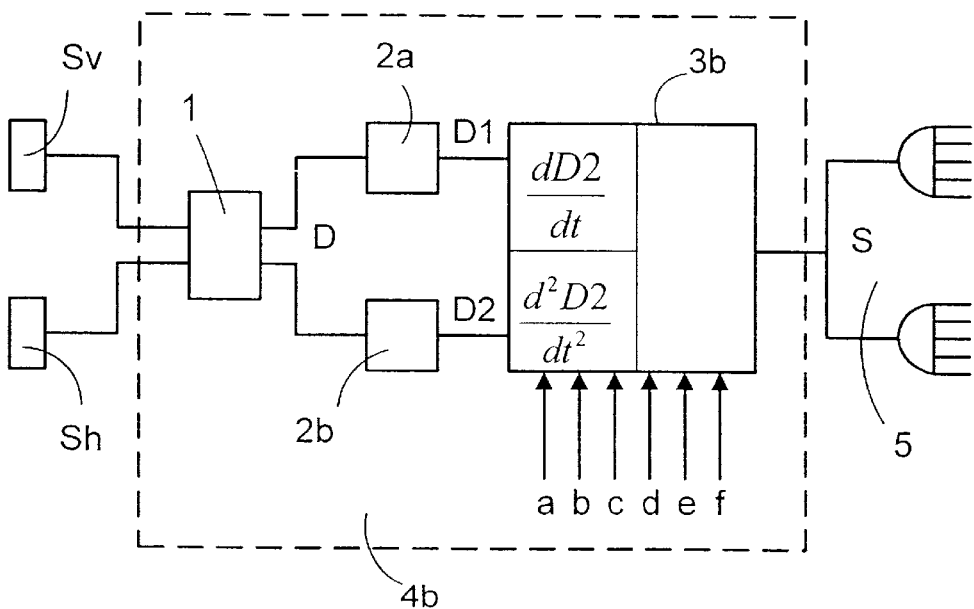
FIG. 2 is a schematic view of a second, very precisely working, automatic headlight leveling system according to the invention.

As in FIG. 1, in FIG. 2, the two level sensors Sv and Sh offset in the longitudinal direction are connected with a level difference detector 1 for measuring the vehicle body pitch angle in the form of a level difference D. The level difference detector 1 is arranged in a control unit 4b. The level difference D formed in the level difference detector 1 is, on the one hand, provided to filters 2a and 2b in the control unit 4b. Filter 2a is a low-pass filter with a large time constant; filter 2b is a low-pass filter with a small time constant. By means of filters 2a and 2b, a static level difference value D1 is formed by averaging the directly measured level difference D for a first defined time period, and a dynamic level difference value D2 is formed by averaging the directly measured level difference D for a second defined time period. As a result of the selection of the time constants, the first time period is significantly longer than the second time period. The level difference values D1 and D2 are therefore further processed level difference values.

The desired value S is determined by the desired-value detector 3b at least as a function of the first derivative dD2/dt of the dynamic level difference value. Preferably, the desired value S is also determined as a function of the second derivative $d^2D2/dt^2$ of the dynamic level difference value D2 in conjunction with vehicle-specific quantities, and of additional information transmitted to the control unit as well. Quantities or information of this type are, for example, the road information a from a navigation system, the distance b to a preceding vehicle from a ranging system, the accelerator pedal position c, the brake pressure d, the vehicle speed e and/or the visual range of a fog sensor. Possible effects of the additional information a to f on the detection of the desired value S were described above.

This embodiment of the invention permits fast control, because it is also foresighted; as well as a highly precise control of the headlight adjustment as a function of actual pitch angle changes.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An automatic leveling system for vehicle headlights comprising:

at least two level sensors which are offset in a longitudinal direction of the vehicle body for measuring vehicle body pitch angle in the form of a level difference; and an electronic control unit for determining a target value for headlight adjustment as a function of the measured level difference;

wherein the control unit determines the target value as a function of the first derivative of at least one of the measured level difference and a further processed level difference.

2. The automatic headlight leveling system according to claim 1, further comprising a filter which averages said level difference over a determinable time period, said time period being a function of the first derivative of measured level difference.

3. The automatic headlight leveling system according to claim 1, wherein:

said electronic control unit determines a static level difference value by averaging at least the measured level difference over a first defined time period, and a dynamic level difference value by averaging at least the measured level difference over a second defined time period, the first time period being substantially longer than the second time period; and the target value is determined as a function of the first derivative of the dynamic level difference value as a further processed level difference.

4. The automatic headlight leveling system according to claim 3, wherein the target value is determined as a function of the second derivative of the dynamic level difference value.

5. The automatic headlight leveling system according to claim 2, wherein the target value is determined as a function of additional vehicle information transmitted to the control unit, said additional vehicle information comprising at least one of vehicle speed, a brake light signal and accelerator pedal position.

6. A method of controlling an inclination angle of vehicle headlights, comprising:

measuring time varying vehicle pitch;

calculating a first derivative, with respect to time, of measured vehicle pitch;

averaging said vehicle pitch over a first time period, wherein said first time period is determined as a function of said calculated first derivative; and generating a headlight adjustment control signal as a function of averaged vehicle pitch determined in said averaging step.

7. The method according to claim 6 wherein said step of averaging comprises filtering said vehicle pitch in a lowpass filter having a time constant which is adjustable based on said first derivative.

8. A method of controlling an inclination angle of vehicle headlights, comprising:

measuring time varying vehicle pitch;

determining a static vehicle pitch by averaging said time varying vehicle pitch over a first time period;

determining a dynamic vehicle pitch by averaging said time variable vehicle pitch over a second time period which is significantly shorter than said first time period;

calculating first and second derivatives, with respect to time, of measured time variable vehicle pitch; and generating headlight adjustment control signals as a function of said static and dynamic averages and at least said first derivative.

9. The method according to claim 8, wherein said headlight control signal is generated as a function of said first and second derivatives.

* * * * *